(12) United States Patent
Zhang et al.

(10) Patent No.: US 9,468,005 B2
(45) Date of Patent: Oct. 11, 2016

(54) DATA SENDING METHOD, DEVICE AND SYSTEM IN HETEROGENEOUS NETWORK

(71) Applicant: Huawei Technologies Co., Ltd., Shenzhen (CN)

(72) Inventors: Yongping Zhang, Shenzhen (CN); Yuan Xia, Shenzhen (CN); Junren Chang, Shenzhen (CN); Shulan Feng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 120 days.

(21) Appl. No.: 14/328,164

(22) Filed: Jul. 10, 2014

(65) Prior Publication Data

US 2014/0321401 A1 Oct. 30, 2014

Related U.S. Application Data

(63) Continuation of application No. PCT/CN2012/087560, filed on Dec. 26, 2012.

(30) Foreign Application Priority Data

Jan. 11, 2012 (CN) .......................... 2012 1 0008665

(51) Int. Cl.
*H04W 72/00* (2009.01)
*H04W 72/04* (2009.01)
(Continued)

(52) U.S. Cl.
CPC .......... *H04W 72/0453* (2013.01); *H04L 5/001* (2013.01); *H04L 5/0053* (2013.01);
(Continued)

(58) Field of Classification Search
CPC ...... H04L 5/00; H04W 16/10; H04W 16/32; H04W 72/0453; H04W 72/12; H04W 84/045; Y02B 60/50

USPC .............. 370/280–281, 276–277, 293, 295, 370/310.2, 315, 328–330, 336–338; 455/509–510, 447, 450, 63.1, 525, 455/451, 452.1, 464

See application file for complete search history.

(56) References Cited

U.S. PATENT DOCUMENTS

2010/0008317 A1* 1/2010 Bhattad ................. H04L 1/0003
370/329

(Continued)

FOREIGN PATENT DOCUMENTS

CN 102264131 A 11/2011
WO WO 2011/085191 A1 7/2011

(Continued)

OTHER PUBLICATIONS

Motorola, "FDM Range Extension in Open-access Heterogeneous Networks" Agenda Item 6.8.1, 3GPP TSG RAN1#62, Madrid, Spain, Aug. 23-27, 2010, 10 pages.

(Continued)

*Primary Examiner* — Mohamed Kamara
(74) *Attorney, Agent, or Firm* — Brinks Gilson & Lione (57) ABSTRACT

Disclosed are a data transmission method, apparatus and system in a heterogeneous network. The data transmission method in a heterogeneous network comprises: a macro base station carrying control information in a subframe, transmitting the control information to a terminal in a control-frequency band, and informing a low power node of the control information; according to the control information, the low power node carrying data information in a subframe and transmitting the data information to a terminal by a data-frequency band; the control-frequency band and the data-frequency band are statically deployed, and the control-frequency band and the data-frequency band are non-overlapped.

14 Claims, 8 Drawing Sheets carry, by a macro BS, control information in a subframe, send the control information to a UE on a control-frequency band, and notify a LPN of the control information — 101 carry, by the LPN, data information in a subframe according to the control information, and send the data information to the UE on a data frequency band, wherein the control-frequency band and the data-frequency band are configured statically, and are not overlapped with each other — 102

(51) Int. Cl.
*H04W 16/32* (2009.01)
*H04W 72/12* (2009.01)
*H04L 5/00* (2006.01)
*H04W 84/04* (2009.01)
*H04W 16/10* (2009.01)

(52) U.S. Cl.
CPC ........... *H04W 16/32* (2013.01); *H04W 72/12* (2013.01); *H04W 16/10* (2013.01); *H04W 84/045* (2013.01); *Y02B 60/50* (2013.01)

(56) References Cited

U.S. PATENT DOCUMENTS

| | | | | |
|---|---|---|---|---|
| 2011/0110251 | A1* | 5/2011 | Krishnamurthy | ... H04W 72/082 370/252 |
| 2011/0170496 | A1* | 7/2011 | Fong | ...... H04L 5/0053 370/329 |
| 2011/0310830 | A1* | 12/2011 | Wu | ..... H04W 72/1289 370/329 |
| 2011/0312319 | A1 | 12/2011 | Lindoff et al. | |
| 2013/0044736 | A1 | 2/2013 | Tanaka | |
| 2013/0084910 | A1* | 4/2013 | Suzuki | ............... H04W 24/02 455/515 |
| 2013/0089051 | A1 | 4/2013 | Bai et al. | |

FOREIGN PATENT DOCUMENTS

| | | |
|---|---|---|
| WO | WO 2011/085192 A1 | 7/2011 |
| WO | WO 2011/135719 A1 | 11/2011 |
| WO | WO 2011/150783 A1 | 12/2011 |
| WO | WO 2012/002855 A1 | 1/2012 |

OTHER PUBLICATIONS

Panasonic, "Simulation Results for Frequency Domain ICIC in HetNets—Macro and Pico Cells with Range Extension" Agenda Item 6.8.1, 3GPP TSG-RAN WG1 Meeting 62bis, Oct. 11-15, 2010, China, 10 pages.
Lte, "3$^{rd}$ Generation Partnership Project; Technical Specification Group Radio Access Network; Evolved Universal Terrestrial Radio Access (E-UTRA) Radio Resource Control (RRC); Protocol Specification" (Release 9) 3GPP TS 36.331, V9.0.0, Sep. 2009, 213 pages.

* cited by examiner

DATA SENDING METHOD, DEVICE AND SYSTEM IN HETEROGENEOUS NETWORK

CROSS-REFERENCE TO RELATED APPLICATIONS

This application is a continuation application of International Application No. PCT/CN2012/087560, filed on Dec. 26, 2012, which claims the priority to Chinese Patent Application No. 201210008665.8, filed on Jan. 11, 2012, both of which are hereby incorporated by reference in their entireties.

FIELD OF THE INVENTION

The present invention relates to the technical field of communication, and in particular to a data sending method, device and system in a heterogeneous network.

BACKGROUND OF THE INVENTION

The heterogeneous network (HetNet) is envisioned as a promising component of cellular network to meet the ever-increasing demand for mobile broad services. In HetNet, both spectral efficiency per unit area and transmit efficiency can be improved significantly by shrinking cell size via the deployment of Low-Power Nodes (LPNs) in the coverage of macro Base Station (BS), which is referred to as macro cell below. Thus in HetNet, the coverage of LPN, which is referred to as LPN cell below, is within one macro cell. Combining full frequency reuse, we can conclude the interference between macro BS and LPN is a serious concern in HetNet.

In the prior art, the network-centric enhanced inter-cell interference coordination (eICIC) technique has been intensively studied in the $3^{rd}$ Generation Partnership Project (3GPP) community. In eICIC, the macro cell is prevented from transmitting data in certain subframe, which are referred to as Almost Blank Subframe (ABS). During ABSs, LPN cells can schedule User Equipments (UEs) that would otherwise experience too high interference from the macro cells.

However, it is founded by the inventor that although the interference experienced by the UE serviced by the LPN cell can be reduced on the specific time/frequency resource of the macro cell by the prior art, there are still the following problems.

Because the macro cell will still transmit Cell-specific Reference Signals (CRS) located in ABS, the interference from the macro cell experienced by the UE that is served by the LPN cell can only be eliminated partially. The remaining interference from the above CRS declines the performance of UEs served by LPNs. The above problem becomes more serious when the Range Expansion (RE) technique is employed to achieve the load balancing between the macro cell and LPN cell. In RE technique, the power received by UEs from LPN cell is artificially increased by adding a fix bias. Thus, some UEs are actively pushed into LPN cells. Under this situation, the remaining interference from the CRS of the macro cell causes the more seriously negative impact on the UEs served by LPN. Furthermore, in a practical system, the traffic is time-variant, and since the configuration of the ABS subframe is half-static, whenever the UEs served by the macro cell require the data transmission, it must wait for the non-ABS subframe to receive the service. The above process will cause the delay on the data transmission and affect the performance of these UEs.

SUMMARY OF THE INVENTION

The technical problem to be solved by the disclosure is to provide a data sending method, device and system in a heterogeneous network, for eliminating the interference of a macro cell on a UE served by a LPN, and ensuring the performance of a practical system.

To solve the above problem, the following technical solutions are adopted in the embodiment of the disclosure.

A data sending method in a heterogeneous network includes:
  carrying, by a macro BS, control information in a subframe, sending the control information to a UE on the control-frequency band, and notifying a LPN of the control information; and
  carrying, by the LPN, data information in a subframe, and sending the data information to the UE on the data-frequency band, according to the control information;
  wherein the control-frequency band and the data-frequency band are configured statically, and are not overlapped with each other.

A data sending method in a heterogeneous network includes:
  receiving, by a UE, control information that is carried in a subframe and sent on the control-frequency band by a macro BS; and
  receiving according to the control information, by the UE, data information that is carried in a subframe and sent on the data-frequency band by a LPN,
  wherein the control-frequency band and the data-frequency band are configured statically, and are not overlapped with each other.

A network device includes:
  a macro BS adapted to carry control information in a subframe, send the control information to a UE on the control-frequency band, and notify a LPN of the control information; and
  a LPN adapted to carry data information in a subframe and send the data information to the UE on the data-frequency band, according to the control information;
  wherein the control-frequency band and the data-frequency band are configured statically, and are not overlapped with each other.

A UE includes:
  a first receiving unit adapted to receive control information that is carried in a subframe and sent on the control-frequency band by a macro BS; and
  a second receiving unit adapted to receive, according to the control information, data information that is carried in a subframe and sent on the data-frequency band by a LPN,
  wherein the control-frequency band and the data-frequency band are configured statically, and are not overlapped with each other.

A data sending system in a heterogeneous network includes the above network device and the above UE.

In the technical solutions of the embodiments of the disclosure, the macro BS sends control information related to control on specific frequency band, i.e., at all the time on the control-frequency band, the LPN sends data information related to service on the other frequency band, i.e., at all the time on the data-frequency band, and the UE receives the control information at all the time on specific frequency band, and receives the data information from the LPN on the corresponding time/frequency resources on the other frequency band according to the control information. Since the control information and the data information are respectively transmitted by the macro BS and the LPN on different carriers or on different bandwidth portions of the same carrier, the interference from the macro cell to the UE that is served by the LPN can be eliminated. In a practical system, the data information can be sent at any time when the UE needs a service, so that the system performance is ensured.

Note that for the simplification, the above assumption of two bands (one control-frequency band and one data-frequency band) will be used below. The number of the control-frequency band and data-frequency band in practice includes but do not limited to the above assumed case.

BRIEF DESCRIPTION OF THE DRAWINGS

In order to illustrate the technical solutions according to the embodiments of the present invention or in the prior art more clearly, drawings to be used in the description of the prior art or the embodiments will be described briefly hereinafter. Apparently, the drawings described hereinafter are only some embodiments of the present invention, and other drawings may be obtained by those skilled in the art according to those drawings without creative labor.

DETAILED DESCRIPTION OF THE INVENTION

Hereinafter, the technical solution in the embodiment of the present invention will be described clearly and completely in conjunction with the drawings in the embodiment of the present invention. Obviously, the described embodiments are only some of the embodiments of the present invention, but not all the embodiments. All the other embodiments obtained by those skilled in the art based on the embodiment in the present invention without creative labor will fall within the scope of protection of the present invention.

Figure 1:
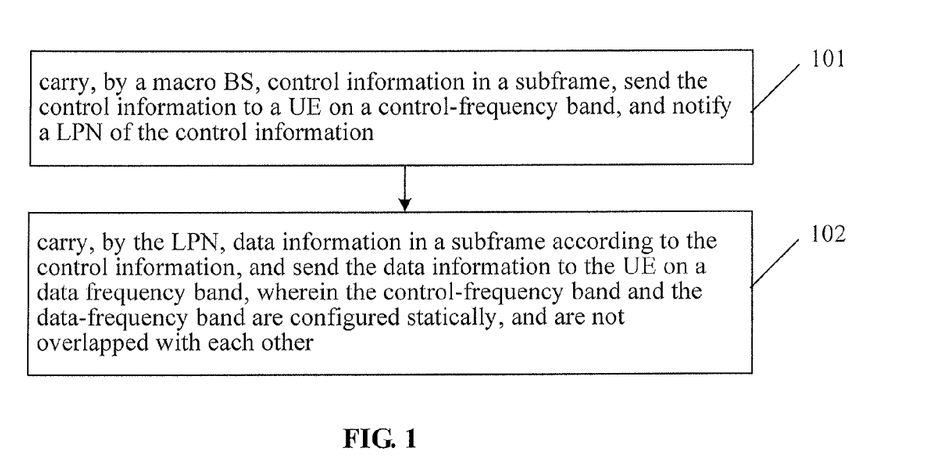
FIG. 1 is a flow chart of a data sending method on a network side in a heterogeneous network according to an embodiment of the disclosure.

It is provided a data sending method, device and system in a heterogeneous network in the embodiment of the disclosure, for eliminating the interference from the macro cell to the UE served by the LPN, and ensuring the performance in a practical system. It is provided a data sending method on a network side in a heterogeneous network in an embodiment of the disclosure, as shown in FIG. 1, and the method includes the following steps 101 and 102.

Step 101, carrying, by a macro BS, control information in a subframe, sending the control information to a UE on the control-frequency band, and notifying a LPN of the control information.

Only the control information is sent by the macro BS to the UE, and the data information is sent by the LPN to the UE. To achieve asynchronous scheduling, the macro BS needs to notify the LPN of the control information.

Carrying by the macro BS the control information in the subframe refers to the fact that only the control information is contained in the subframe at the macro BS, no data information is contained; i.e., only the control information is sent by the macro BS at all the transmitting time. In an embodiment, all OFDM symbols at the macro BS are used to carry the control information.

Step 102, carrying, by the LPN, data information in a subframe, and sending the data information to the UE on data-frequency band, according to the control information, wherein the control-frequency band and the data-frequency band are configured statically, and are not overlapped with each other.

The resource of the macro cell and LPN cell is separated in the time domain or the frequency domain by subframe or frequency band respectively. The macro BS sends the control information on the corresponding frequency band at all transmitting time; and the LPN BS sends the data information on the corresponding frequency band at all transmitting time.

Carrying by the LPN BS the data information in the subframe refers to the fact that only the data information is contained in the subframe at the LPN BS, no control information is contained; i.e., only the data information is sent by the LPN at all transmitting time. In an embodiment, all OFDM symbols at the LPN are used to the data information.

In the method according to the embodiment of the disclosure, the configuration of the frequency band is a static configuration, and is performed by an operator when constructing a network; the position of the frequency band is static, which means that it does not vary with time and service, and the control-frequency band and the data-frequency band do not overlap with each other, and therefore they do not interfere with each other.

It is to be noted that the frequency bands can be different bandwidth portions of the same carrier or different carriers. In this embodiment, that the control-frequency band and the data-frequency band do not overlap with each other includes:

the control-frequency band and the data-frequency band are on different bandwidth portions of the same carrier; or the control-frequency band and the data-frequency band are on different carriers.

Figure 2:
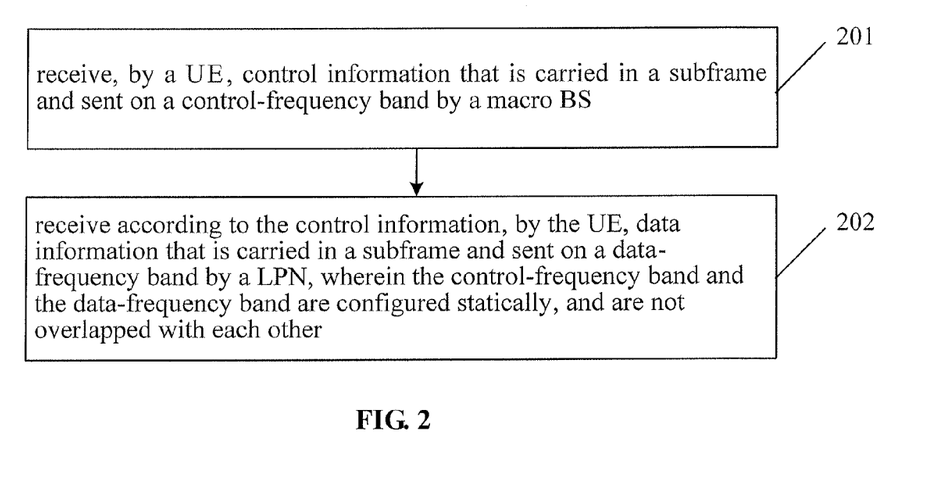
FIG. 2 is a flow chart of a data sending method on a UE side in a heterogeneous network according to an embodiment of the disclosure.

It is further provided a data sending method on a UE side in a heterogeneous network according to an embodiment of the disclosure, as shown in FIG. 2, and the method includes the following steps 201 and 202.

Step 201, receiving, by a UE, control information that is carried in a subframe and transmitted on a control-frequency band by a macro BS.

Only the control information is sent by the macro BS to the UE, and the data information is sent by the LPN to the UE. To achieve asynchronous scheduling, the macro BS needs to notify the LPN of the control information.

Carrying by the macro BS the control information in the subframe refers to the fact that only the control information is contained in the subframe at the macro BS, no data information is contained; i.e., only the control information is sent by the macro BS at all the transmitting time. In an embodiment, all OFDM symbols at the macro BS are used to carry the control information.

Step 202, receiving according to the control information, by the UE, data information that is carried in a subframe and sent on the data-frequency band by a LPN, wherein the control-frequency band and the data-frequency band are configured statically, and are not overlapped with each other.

The resource of the macro cell and LPN cell is separated in the time domain or the frequency domain by subframe or frequency band respectively. The macro BS sends the control information on the corresponding frequency band at all transmitting time; and the LPN sends the data information on the corresponding frequency band at all transmitting time.

Carrying by the LPN the data information in the subframe refers to the fact that only the data information is contained in the subframe at the LPN, no control information is contained; i.e., only the data information is sent by the LPN at all transmitting time. In an embodiment, all OFDM symbols at the LPN are used to carry the data information.

In the method according to the embodiment of the disclosure, the configuration of the frequency band is static configuration, and is performed by an operator when constructing a network; the position of the frequency band is static, which means that it does not vary with time and service, and the control-frequency band and the data-frequency band do not overlap with each other, and they do not interfere with each other.

It is to be noted that the frequency bands can be different bandwidth portions of the same carrier, or can be different carriers. In this embodiment, that the control-frequency band and the data-frequency band do not overlap with each other includes:

the control-frequency band and the data-frequency band are on different bandwidth portions of the same carrier; or the control-frequency band and the data-frequency band are on different carriers.

In the technical solutions of the disclosure, the macro BS sends control information on specific frequency band, i.e., at all the time on the control-frequency band, the LPN sends data information related to service on the other frequency band, i.e., at all the time on the data-frequency band, and the UE receives the control information at all time on specific frequency band, and receives the data information from the LPN on the corresponding time/frequency resources on the other frequency band according to the control information. Since the control information and the data information are respectively sent by the macro BS and the LPN on different carriers or on different bandwidth portions of the same carrier, the interference from the macro cell to the UE that is served by the LPN can be eliminated completely. In a practical system, the data information can be sent at any time when the UE needs a service, so that the system performance is ensured.

Specifically, it is provided a data transmitting method in a heterogeneous network in an embodiment of the disclosure. In this embodiment, a Long Time Evolution (LTE) system is used as an example for clear description. The proposed data transmitting method in the heterogeneous network is based on carrier allocation in the heterogeneous network, i.e., configuring a plurality of component carriers between the macro BS and the LPN using Carrier Aggregation (CA) technique. The plurality of component carriers includes control carriers and service carriers. The transmission of the control carrier is restricted at the macro BS, and the transmission of the data carriers is restricted at the LPN. In this embodiment, the technical solution of the disclosure is described by assuming that two CCs are provided, where CC1 is the control carrier, and CC2 is the data carrier. It is to be noted that the above assumption is only for the convenience of description, the number of the control carriers and the number of the data carriers in practice include but do not limited to the above assumed case.

Figure 3:
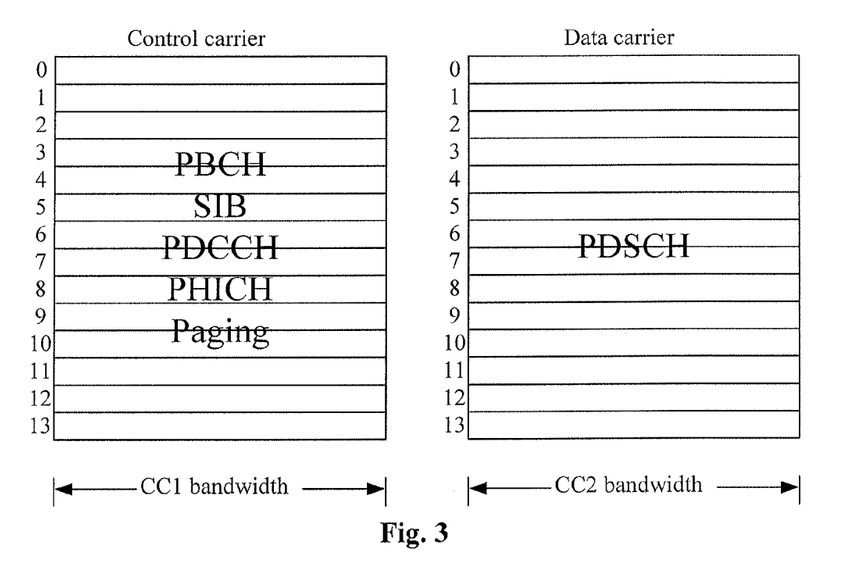
FIG. 3 is a schematic diagram of a frame structure distributed based on a carrier according to an embodiment of the disclosure.

It is to be noted that in the LTE system in the prior art, among the 14 symbols of each subframe, at most the former 3 symbols are used for the control channel, and the other symbols are used for the Physical Downlink Shared Channel (PDSCH), System Information Blocks (SIB), Paging messages and the like. And in this embodiment, all the resources on CC1 are used to send the downlink control information, including the Physical Broadcast Channel (PBCH), SIB, Physical Downlink Control Channel (PDCCH), Physical Hybrid-ARQ Indicator Channel (PHICH), Paging messages and the like; and all the resources on CC2 are only used to send the service data, i.e., PDSCH. Specifically, the corresponding frame structure is shown in FIG. 3, 14 symbols in each subframe at the macro BS, which is operation at CC1 are used to carry the control information and transmit the control information; and 14 symbols of each subframe of the LPN, which is operating at CC2 are used to transmit the data information.

Figure 4:
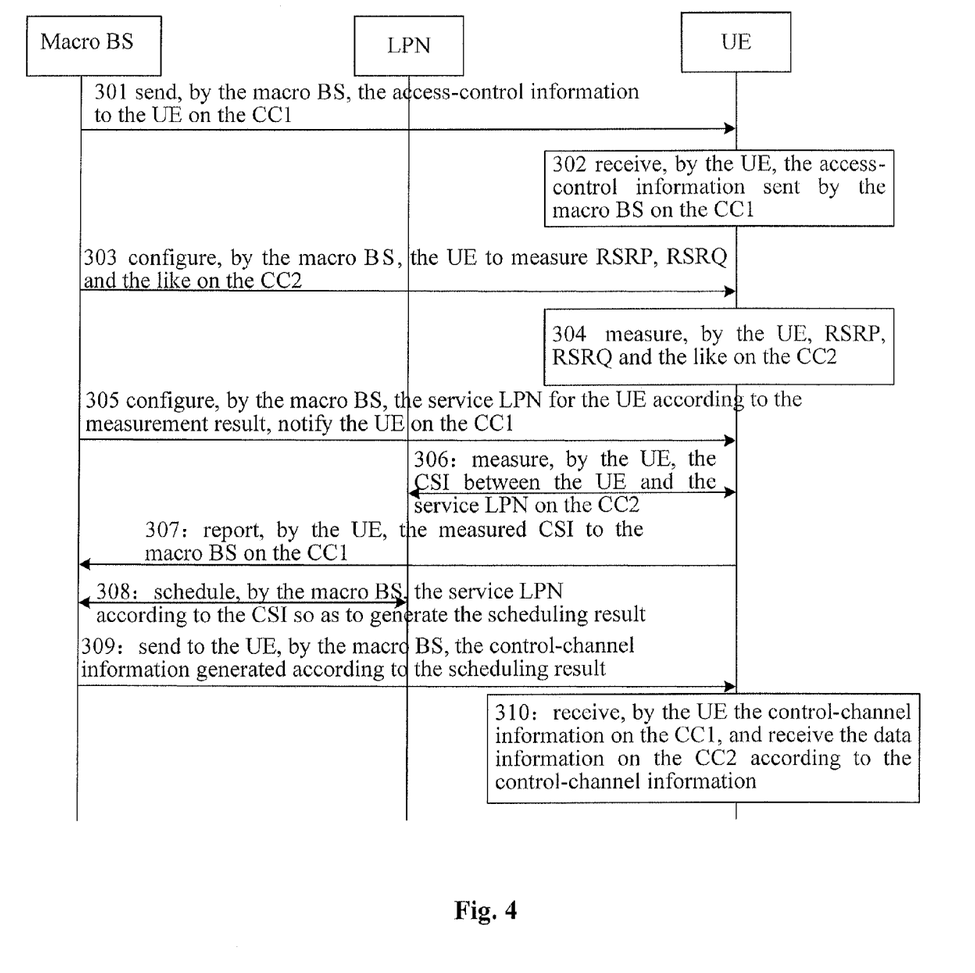
FIG. 4 is a signaling diagram in an implementation of a data sending method in a heterogeneous network according to an embodiment of the disclosure.

As shown in FIG. 4, the specific implementation process of the above method for carrier allocation in the heterogeneous network includes the following steps 301 to 310.

Step 301, sending, by the macro BS, the access-control information to the UE on CC1.

The macro BS carries the access-control information in the subframe, and transmits the access-control information to the UE on the control frequency, i.e., CC1.

Step 302, receiving, by the UE, the access-control information transmitted by the macro BS on CC1.

The UE firstly receives the access-control information on CC1, and then accesses the network based on the received control information.

By taking the LTE system as an example, the access-control information includes Physical Broadcast Channel (PBCH), SIB1 and SIB2.

Step 303, configuring, by the macro BS, the UE to measure Reference Signal Received Power (RSRP), Reference Signal Received Quality (RSRQ) and the like on CC2.

Step 304, measuring, by the UE, RSRP, RSRQ and the like on CC2.

Step 305, configuring, by the macro BS, the serving LPN of the UE according to RSRP, RSRQ and the like measured by the UE on CC2, and notifying the UE on CC1 using the downlink signaling.

The macro BS configures the serving LPN of the UE according to RSRP, RSRQ and the like measured by the UE on CC2, and notifies the UE on CC1 using the downlink signaling. The serving LPN is the LPN that provides service for the UE. Here, the notification information includes the information of CC2, such as the frequency, cell identifier of CC2 and the like.

Step 306, measuring, by the UE, the Channel State Information (CSI) between the UE and the serving LPN on CC2, wherein the CSI includes Rank Indication (RI), Channel Quality Indication (CQI), and Preceding Matrix Indicator (PMI).

Step 307, reporting, by the UE, the measured CSI to the macro BS on CC1.

Step 308, scheduling, by the macro BS, the serving LPN or UE according to the CSI so as to generate the scheduling result.

Specifically, the scheduling result refers to the load allocation for the service LPN or UE, the serving LPN or the UE is configured according to the scheduling result, so that the serving LPN or UE transmits the data according to the scheduling result in the subsequent data transmission process.

In this embodiment, the scheduling of the serving LPN or UE by the macro BS can be implemented in the distributed manner or centralized manner.

In the distributed scheduling, the macro BS transmits the CSI reported by the UE to the serving LPN that provides service for the UE, and each service LPN schedules the UE that is serviced by the LPN according to the CSI, and sends the scheduling result to the macro BS, so that the macro BS generates the control information according to the scheduling result and sends the control information to the UE.

In the centralized scheduling, the macro BS jointly schedules the time/frequency resources of all the associated LPNs thereon according to the CSI reported by the UEs, to obtain the scheduling result, and sends the scheduling result to each associated LPN, so that each LPN sends the data on CC2 according to the scheduling result. Note that the above associated LPNs are connected to the macro BS via backhaul link.

Step 309, transmitting to the UE, by the macro BS, the control-channel information on CC1 generated according to the scheduling result.

Step 310, receiving, by the UE the control-channel information on CC1, and receiving the data information on CC2 according to the control-channel information.

In the technical solutions of the disclosure, the macro BS transmits control information on specific frequency band, i.e., at all the time on the control-frequency band, the LPN transmits data information related to service on the other frequency band, i.e., at all the times on the data-frequency band, and the UE receives the control information at all times on specific frequency band, and receives the data information from the LPN on the corresponding time/frequency resource on the other frequency band according to the control information. Since the control information and the data information are respectively sent by the macro BS and the LPN, the interference from the macro cell to the UE that is served by the LPN can be eliminated, completely. In a practical system, the data information can be sent at any time when the UE needs a service, so that the system performance is ensured.

It is further provided a data sending method in a heterogeneous network according to an embodiment of the disclosure, which is different from the first embodiment in that this data sending method is a method for sending data using bandwidth allocation in the heterogeneous network which is operating at the single carrier. Specifically, in this embodiment, based on the frequency-division technique, a plurality of bands (denoted by BW below) with different bandwidth are configured for the macro BS and the LPN respectively. The plurality of BWs includes control bands and service bands. The configuration information about control bands is sent by the macro BS, and the configuration information about the service bands is sent by the LPN. In this embodiment, two BWs are assumed, wherein BW1 is the control band, and BW2 is the service band. It is to be noted that the above assumption is only for the convenience of description, the number, width and position of the control bands and the service bands in practice include but do not limited to the above assumed case.

Figure 5:
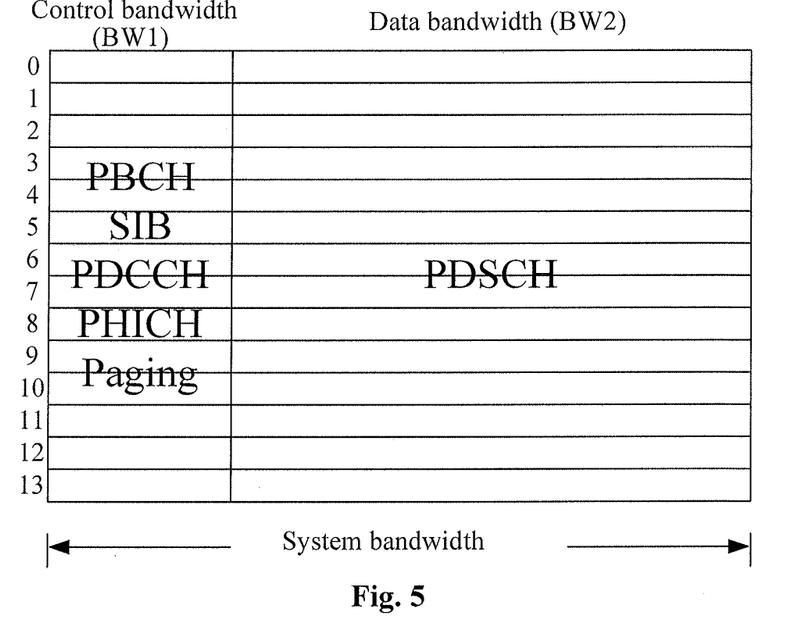
FIG. 5 is a schematic diagram of a frame structure distributed based on a bandwidth according to an embodiment of the disclosure.

It is to be noted that in the LTE system in the prior art, among the 14 symbols of each subframe, at most the former 3 symbols are used for the control channel, and the other symbols are used for the PDSCH, the SIB, the Paging messages and the like. And in this embodiment, it is different from the LTE of the prior art in that all the time/frequency resources on the BW1 are used to transmit the downlink-control information, including the PBCH, and/or the SIB, the PDCCH, the PHICH, the Paging messages and the like; and all the resources on the BW2 are only used to send data information related to the service and/or the SIB, the PDCCH, the PHICH, and the paging messages. Specifically, the frame structure is shown in FIG. 5, all the 14 symbols of each subframe of the macro BS are used to carry the control information and transmit the control information on the control band, i.e., BW1; and all the 14 symbols of each subframe of the LPN are used to carry the data information and send the data information on the data band, i.e., BW2.

The specific implementation process for sending data using bandwidth allocation in the heterogeneous network in this embodiment is the same as the implementation of the method for sending data using the carrier allocation. We omit the details here for simplicity.

In the technical solutions of the disclosure, the macro BS transmits control information on specific frequency band, i.e., at all the time on the control band, the LPN transmits data information related to service on the other frequency band, i.e., at all the time on the data band, and the UE receives the control information at all time on specific frequency band, and receives the data information from the LPN on the corresponding time/frequency resources on the other frequency band according to the control information. Since the control information and the data information are respectively transmitted by the macro BS and the LPN on non-overlapped frequency resources, the interference from the macro cell to the UE that is served by the LPN can be eliminated, completely. In a practical system, the data information can be sent at any time when the UE needs a service, so that the system performance is ensured.

Figure 6:
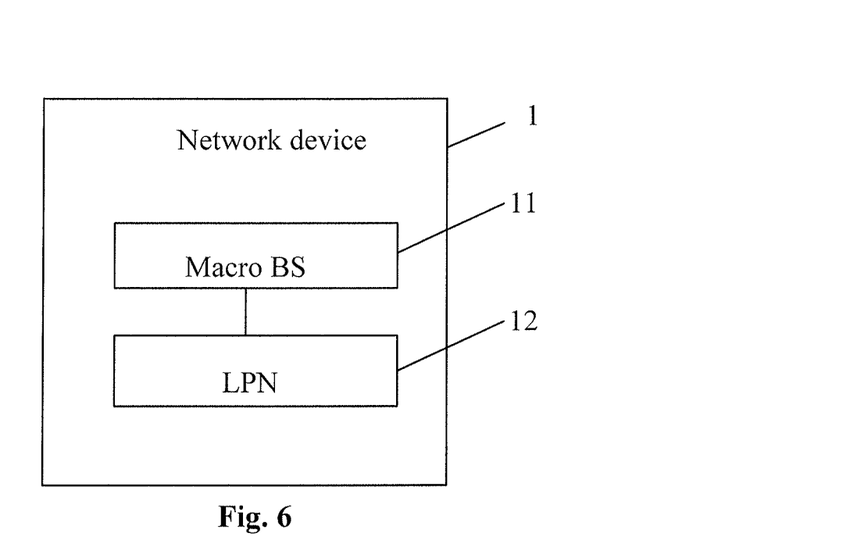
FIG. 6 is schematic structural diagram of a network device according to an embodiment of the disclosure.

It is further provided a network device for implementing the above data sending method in the heterogeneous network according to the embodiment of the disclosure, as shown in FIG. 6. The network device 1 includes: a macro BS, i.e., unit 11 and a LPN, i.e., unit 12.

Specifically, macro BS 11 is adapted to carry control information in a subframe, send the control information to a UE on a control-frequency band, and notify a LPN of the control information; and LPN 12 is adapted to carry data information in a subframe, and send the data information to the UE on a data-frequency band, according to the control information, wherein the control-frequency band and the data-frequency band are configured statically, and are not overlapped with each other. That the control-frequency band and the data-frequency band are not overlapped with each other includes: the control-frequency band and the data-frequency band are on different bandwidth portions of the same carrier; or the control-frequency band and the data-frequency band are on different carriers. Further, macro BS 11 and LPN 12 are further adapted to configure a plurality of component-frequency bands between macro BS 11 and LPN 12. The component-frequency bands consist of the control-frequency bands and the data-frequency bands.

Figure 7:
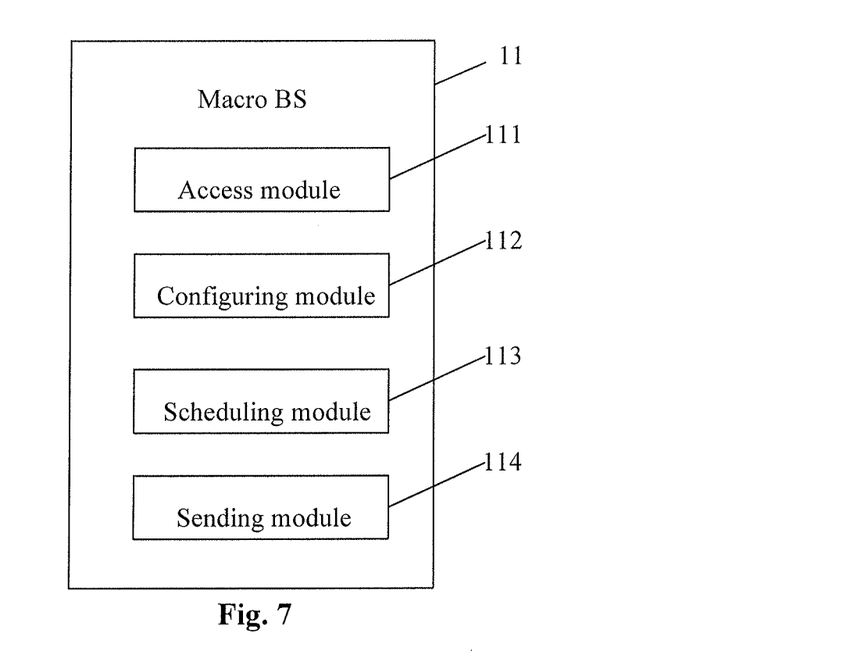
FIG. 7 is a schematic structural diagram of a macro BS of a network device according to an embodiment of the disclosure.

Further, as shown in FIG. 7, macro BS 11 includes an access module, i.e., module 111, a configuring module, i.e., module 112, a scheduling module, i.e., module 113 and a transmitting module, i.e., module 114.

Specifically, access module 111 is adapted to carry access-control information in the subframe, and transmit the access-control information to the UE on the control-frequency band; configuring module 112 is adapted to configure a serving LPN for the UE according to RSRP and RSRQ measured by the UE on the data frequency band, and notify the UE on the control-frequency band through a downlink signaling, wherein the serving LPN is the LPN that provides service for the UE; scheduling module 113 is adapted to generate a scheduling result for the serving LPN or the UE according to CSI, which is reported by the UE, between the UE and the serving LPN; and transmitting module 114 is adapted to carry in the subframe control-channel information generated according to the scheduling result, and transmit the control-channel information to the UE on the control-frequency band.

Further, the scheduling of the serving LPN by the macro BS can be implemented in the distributed manner or centralized manner.

Figure 8:
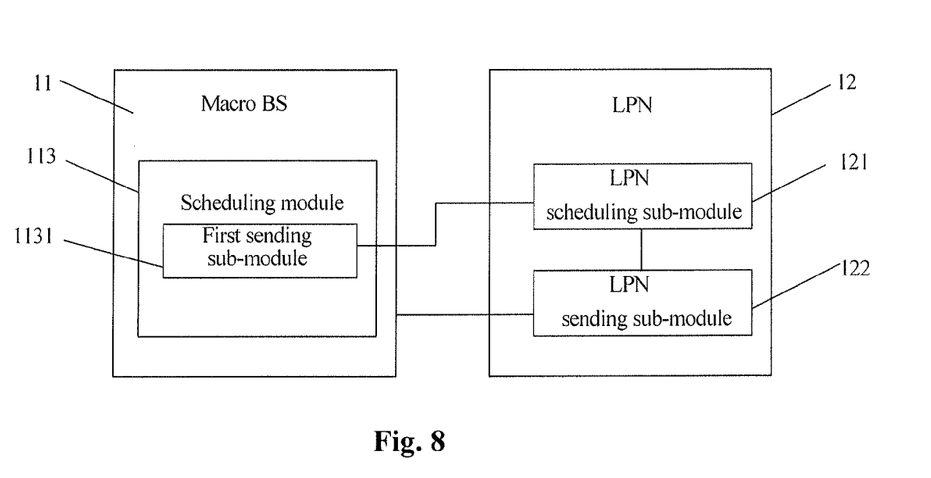
FIG. 8 is a schematic structural diagram of a macro BS and a LPN of a network device according to an embodiment of the disclosure.

In the distributed scheduling, as shown in FIG. 8, scheduling module 113 includes a first sending sub-module, i.e., module 1131, adapted to send the CSI to the serving LPN.

LPN 12 includes: a LPN scheduling sub-module, i.e., module 121, adapted to schedule the serving LPN and the UE; and a LPN sending sub-module, i.e., 122, adapted to send the scheduling result for the UE to macro BS 11.

Figure 9:
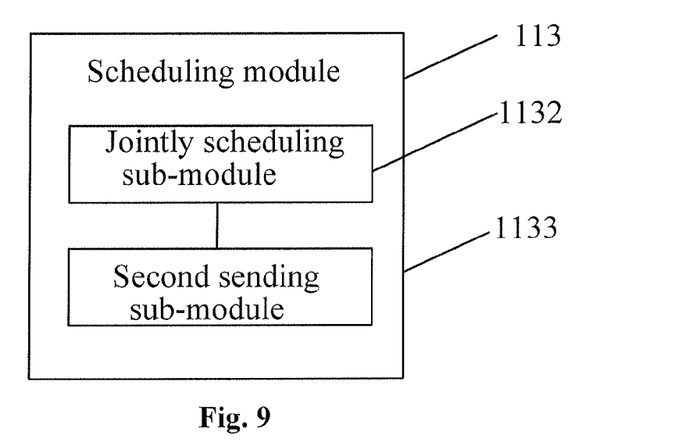
FIG. 9 is a schematic structural diagram of a scheduling module of a macro BS according to an embodiment of the disclosure.

In the centralized scheduling, as shown in FIG. 9, scheduling module 113 includes a jointly scheduling sub-module, i.e., module 1132, and a second sending sub-module i.e., module 1133.

Joint scheduling sub-module 1132 is adapted to jointly schedule time/frequency resources of the serving LPN according to the CSI, to obtain the scheduling result for the serving LPN; and the second sending sub-module 1133 is adapted to send the scheduling result for the serving LPN to the serving LPN.

Further, LPN 12 is adapted to send the data information to the UE on the data-frequency band according to the scheduling result for the serving LPN or the UE.

Figure 10:
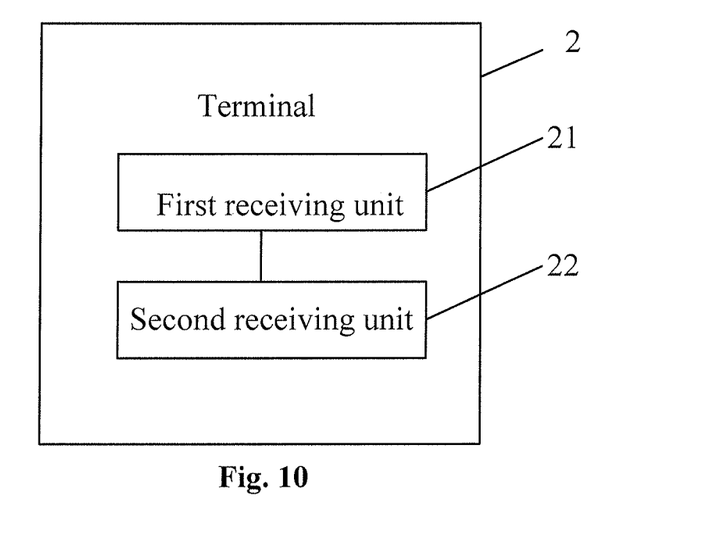
FIG. 10 is a schematic structural diagram of a UE according to an embodiment of the disclosure.

It is further provided a UE for implementing the above data sending method in the heterogeneous network according to the embodiment of the disclosure, as shown in FIG. 10. UE 2 includes a first receiving unit, i.e., unit 21, and a second receiving unit, i.e., unit 22.

The first receiving unit, i.e., unit 21, is adapted to receive control information that is carried in a subframe and sent on a control-frequency band by a macro BS; and the second receiving unit, i.e., unit 22, is adapted to receive, according to the control information, data information that is carried in a subframe and sent on a data-frequency band by a LPN, wherein the control-frequency band and the data-frequency band are configured statically, and are not overlapped with each other. That the control-frequency band and the data-frequency band are not overlapped with each other includes:
the control-frequency band and the data-frequency band are on different bandwidth portions of the same carrier; or
the control-frequency band and the data-frequency band are on different carriers.

Figure 11:
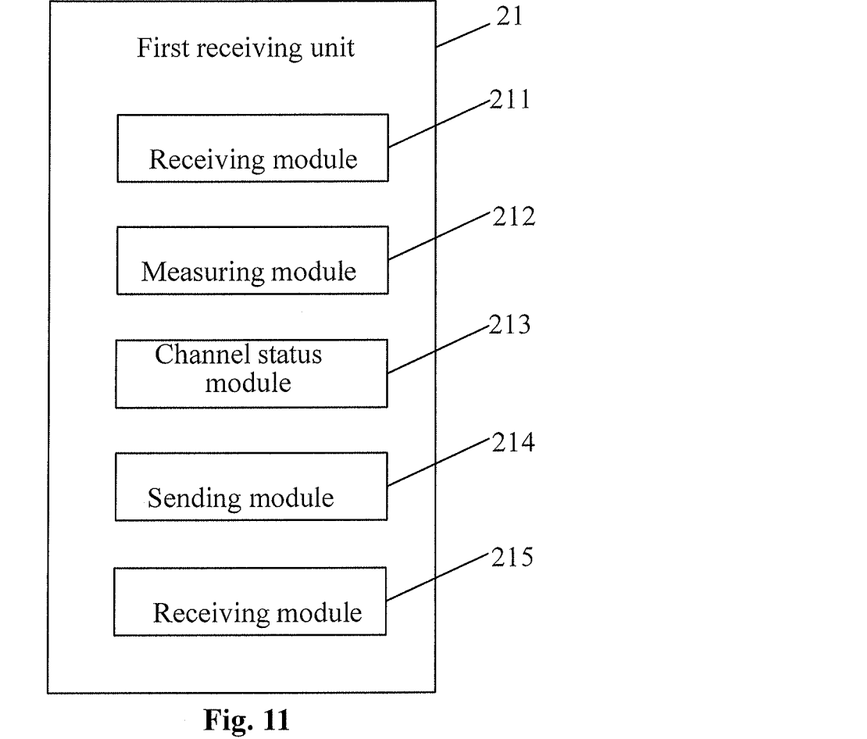
FIG. 11 is a schematic structural diagram of a first receiving unit of a UE according to an embodiment of the disclosure.

Further, as shown in FIG. 11, the first receiving unit, i.e., unit 21, includes: an access module, i.e., module 211, a measurement reporting module, i.e., module 212, a CSI measurement module, i.e., module 213, a sending module, i.e., module 214 and a receiving module, i.e., module 215.

The access module, i.e., module 211, is adapted to receive access-control information that is carried in the subframe and sent on the control-frequency band by the macro BS; the measurement reporting module, i.e., module 212, is adapted to send RSRP and RSRQ measured on the data-frequency band to the macro BS, in order that the macro BS configures a serving LPN for the UE, wherein the serving LPN is the LPN that provides service to the UE; the channel status module, i.e., module 213, is adapted to measure CSI between the UE and the serving LPN on the data-frequency band; the sending module, i.e., module 214, is adapted to send the CSI to the macro BS on the control-frequency band, in order that the macro BS generates a scheduling result for the serving LPN according to the CSI; and the receiving module, i.e., module 215, is adapted to receive control-channel information that is generated from the scheduling result, carried in the subframe and sent on the control-frequency band by the macro BS.

Figure 12:
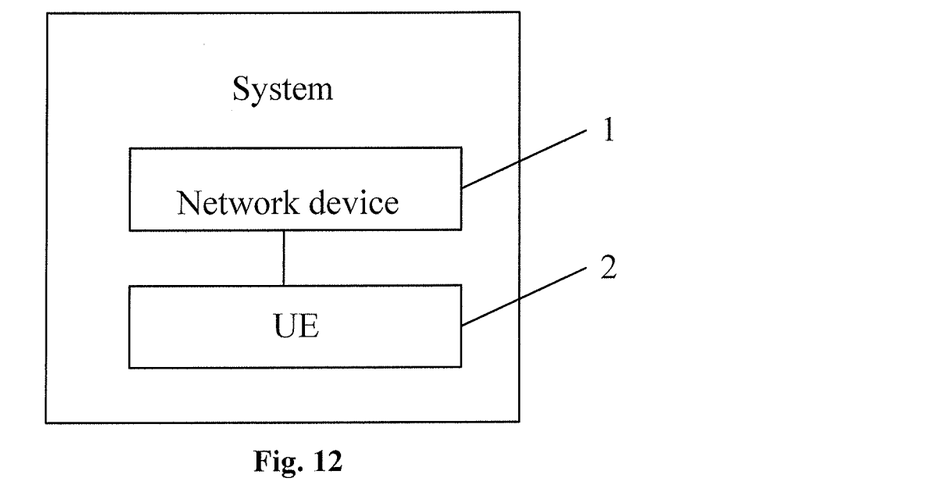
FIG. 12 is a schematic structural diagram of a data sending system in a heterogeneous network according to an embodiment of the disclosure.

It is further provided a data sending system in a heterogeneous network according to an embodiment of the disclosure, as shown in FIG. 12. The system includes the above network device, i.e., device 1, and the above UE, i.e., UE 2.

In the technical solutions of the disclosure, the macro BS transmits control information on specific frequency band, i.e., at all the time on the control-frequency band, the LPN sends data information related to service on the other frequency band, i.e., at all the time on the data-frequency band, and the UE receives the control information at all time on specific frequency band, and receives the data information from the LPN on the corresponding time/frequency resources on the other frequency band according to the control information. Since the control information and the data information are respectively sent by the macro BS and the LPN, the interference from the macro cell to the UE that is served by the LPN can be eliminated. In a practical system, the data information can be sent at any time when the UE needs a service, so that the system performance is ensured.

It can be understood by those skilled in the art from the above description of the embodiments that the invention can be implemented in the manner of software in addition to necessary hardware, and can also be implemented in hardware, but the former is a preferred manner in most cases. Based on this understanding, the technical solution of the invention essentially or the part of the technical solution of the invention that contributes to the prior art can be embodied in a software product which can be stored in a readable storage medium, such as a soft disk, a hard disk or CD of a computer, several instructions are included in the software product for cause a computer device (which can be a personal computer, a server, a network device or the like) to perform the methods described in various embodiments.

The above are only embodiments of the invention, and the scope of protection of the invention is not limited thereto, any variation or alternation that is conceivable easily by those skilled in the art within the technical scope disclosed in the invention fall within the scope of protection of the invention. Therefore, the scope of protection of the invention should be subjected to the scope of protection of the claims.

The invention claimed is:

1. A data sending method in a heterogeneous network, comprising:
   carrying, by a macro base station (BS), control information in a subframe, sending the control information to a user equipment, UE, on a control-frequency band, wherein all Orthogonal Frequency Division Multiplexing (OFDM) symbols at the macro BS are configured to carry the control information; and
   notifying, by the macro base station, a low power node (LPN) of the control information,
   wherein the control-frequency band and a data-frequency band are configured statically,
   wherein the data-frequency band is used by the LNP to send data information to the UE according to the control information, wherein all OFDM symbols at the LPN are configured to carry the data information, and
   wherein the control-frequency band and the data-frequency band are on different bandwidth portions of the same carrier; or the control-frequency band and the data-frequency band are on different carriers.

2. The method according to claim 1, wherein the carrying, by a macro BS, control information in a subframe, sending the control information to a UE on a control-frequency band comprises:
   carrying, by the macro BS, access-control information in the subframe, and sending the access-control information to the UE on the control-frequency band;
   configuring a serving LPN for the UE, by the macro BS, according to Reference Signal Received Power (RSRP) and Reference Signal Received Quality (RSRQ) measured by the UE on the data-frequency band, and notifying the UE on the control-frequency band through the downlink signaling, wherein the serving LPN is the LPN that provides service to the UE;
   generating, by the macro BS, a scheduling result for the serving LPN or the UE according to channel state information, CSI, between the UE and the serving LPN that is reported by the UE; and
   carrying in the subframe, by the macro BS, control-channel information generated according to the scheduling result, and sending the control-channel information to the UE on the control-frequency band.

3. The method according to claim 2, wherein the generating, by the macro BS, a scheduling result for the serving LPN or the UE according to CSI between the UE and the serving LPN that is reported by the UE comprises one of:
   sending, by the macro BS, the CSI to the serving LPN; and
   receiving, by the macro BS, a scheduling result for the UE, wherein the scheduling result is generated by the serving LPN to schedule the UE according to the CSI; or
   jointly scheduling, by the macro BS, time/frequency resources of the serving LPNs associated with the macro BS according to the CSI, to obtain the scheduling result for the serving LPNs; and
   sending, by the macro BS, the scheduling result for the respective serving LPN to the corresponding serving LPN.

4. The method according to claim 2, wherein
the LPN sends the data information to the UE on the data-frequency band according to the scheduling result for the serving LPN or the UE.

5. The method according to claim 3, wherein
the LPN sends the data information to the UE on the data-frequency band according to the scheduling result for the serving LPN or the UE.

6. A data sending method in a heterogeneous network, comprising:
   receiving, by a user equipment, UE, control information that is carried in a subframe and sent on a control-frequency band by a macro base station (BS) wherein all Orthogonal Frequency Division Multiplexing (OFDM) symbols at the macro BS are configured to carry the control information; and
   receiving according to the control information, by the UE, data information that is carried in a subframe and sent on a data-frequency band by a low power node (LPN) according to the control information sent from the macro BS, wherein all OFDM symbols at the LPN are configured to carry the data information,
   wherein the control-frequency band and the data-frequency band are configured statically
   the control-frequency band and the data-frequency band are on different bandwidth portions of the same carrier; or the control-frequency band and the data-frequency band are on different carriers.

7. The method according to claim 6, wherein the receiving, by a UE, control information that is carried in a subframe and sent on a control-frequency band by a macro BS comprises:
   receiving, by the UE, access-control information that is carried in the subframe and sent on the control-frequency band by the macro BS;
   sending, by the UE, to the macro BS, Reference Signal Received Power (RSRP) and Reference Signal Received Quality (RSRQ) measured on the data-frequency band, by which the macro BS configures a serving LPN for the UE, wherein the serving LPN is the LPN that provides service to the UE;
   measuring, by the UE, channel state information (CSI) between the UE and the serving LPN on the data-frequency band;
   sending, by the UE, the CSI to the macro BS on the control-frequency band, by which the macro BS generates a scheduling result for the serving LPN or the UE; and
   receiving, by the UE, control-channel information that is generated from the scheduling result, carried in the subframe and sent on the control-frequency band by the macro BS.

8. A network device, comprising:
   a macro base station, BS, configured to carry control information in a subframe, send the control information to a user equipment (UE) on a control-frequency band, and notify a low power node, LPN, of the control information;
   wherein the control-frequency band and a data-frequency band are configured statically,
   wherein the data-frequency band is used by the LNP to send data information to the UE, wherein all Orthogonal Frequency Division Multiplexing (OFDM) symbols at the LPN are configured to carry the data information, and wherein the control-frequency band and the data-frequency band are on different bandwidth portions of the same carrier; or the control-frequency band and the data-frequency band are on different carriers.

9. The device according to claim 8, wherein the macro BS comprises a processor configured to:

carry access-control information in the subframe, and send the access-control information to the UE on the control-frequency band;

configure a serving LPN for the UE according to Reference Signal Received Power (RSRP) and Reference Signal Received Quality (RSRQ) measured by the UE on the data-frequency band, and notify the UE on the control-frequency band through the downlink signaling, wherein the serving LPN is the LPN that provides service to the UE;

generate a scheduling result for the serving LPN or the UE according to channel state information (CSI) between the UE and the serving LPN that is reported by the UE; and carry in the subframe control-channel information generated according to the scheduling result, and send the control-channel information to the UE on the control-frequency band.

10. The device according to claim 9, wherein the processor is further configured to send the CSI to the serving LPN; and receive a scheduling result for the UE, wherein the scheduling result is generated by the serving LPN scheduling the UE according to the CSI; or the processor is further configured to jointly schedule time/frequency resources of the serving LPNs associated with the macro BS according to the CSI, to obtain the scheduling result for the serving LPNs; and send the scheduling result for the respective serving LPN to the corresponding serving LPN.

11. The device according to claim 9, wherein the LPN is configured to send the data to the UE on the data-frequency band according to the scheduling result for the serving LPN or the UE.

12. The device according to claim 10, wherein the LPN is configured to send the data to the UE on the data-frequency band according to the scheduling result for the serving LPN or the UE.

13. A user equipment, UE, comprising:

a first receiving unit configured to receive control information that is carried in a subframe and sent on a control-frequency band by a macro base station (BS) wherein all Orthogonal Frequency Division Multiplexing (OFDM) symbols at the macro BS are configured to carry the control information; and a second receiving unit configured to receive, according to the control information, data information that is carried in a subframe and sent on a data-frequency band by a low power node (LPN) according to the control information sent from the macro BS, wherein all OFDM symbols at the LPN are configured to carry the data information, wherein the control-frequency band and the data-frequency band are configured statically, and wherein the control-frequency band and the data-frequency band are on different bandwidth portions of the same carrier; or the control-frequency band and the data-frequency band are on different carriers.

14. The UE according to claim 13, wherein the first receiving unit comprises:

an access module configured to receive access-control information that is carried in the subframe and sent on the control-frequency band by the macro BS;

a measuring module configured to send to the macro BS Reference Signal Received Power (RSRP) and Reference Signal Received Quality (RSRQ) measured on the data-frequency band, by which the macro BS configures a serving LPN for the UE, wherein the serving to LPN is the LPN that provides service for the UE;

a channel state module configured to measure channel state information (CSI) between the UE and the serving LPN on the data-frequency band;

a sending module configured to send the CSI to the macro BS on the control-frequency band, by which the macro BS generates a scheduling result for the serving LPN according to the CSI; and a receiving module configured to receive control-channel information that is generated from the scheduling result, carried in the subframe and sent on the control-frequency band by the macro BS.

* * * * *